UNITED STATES PATENT OFFICE.

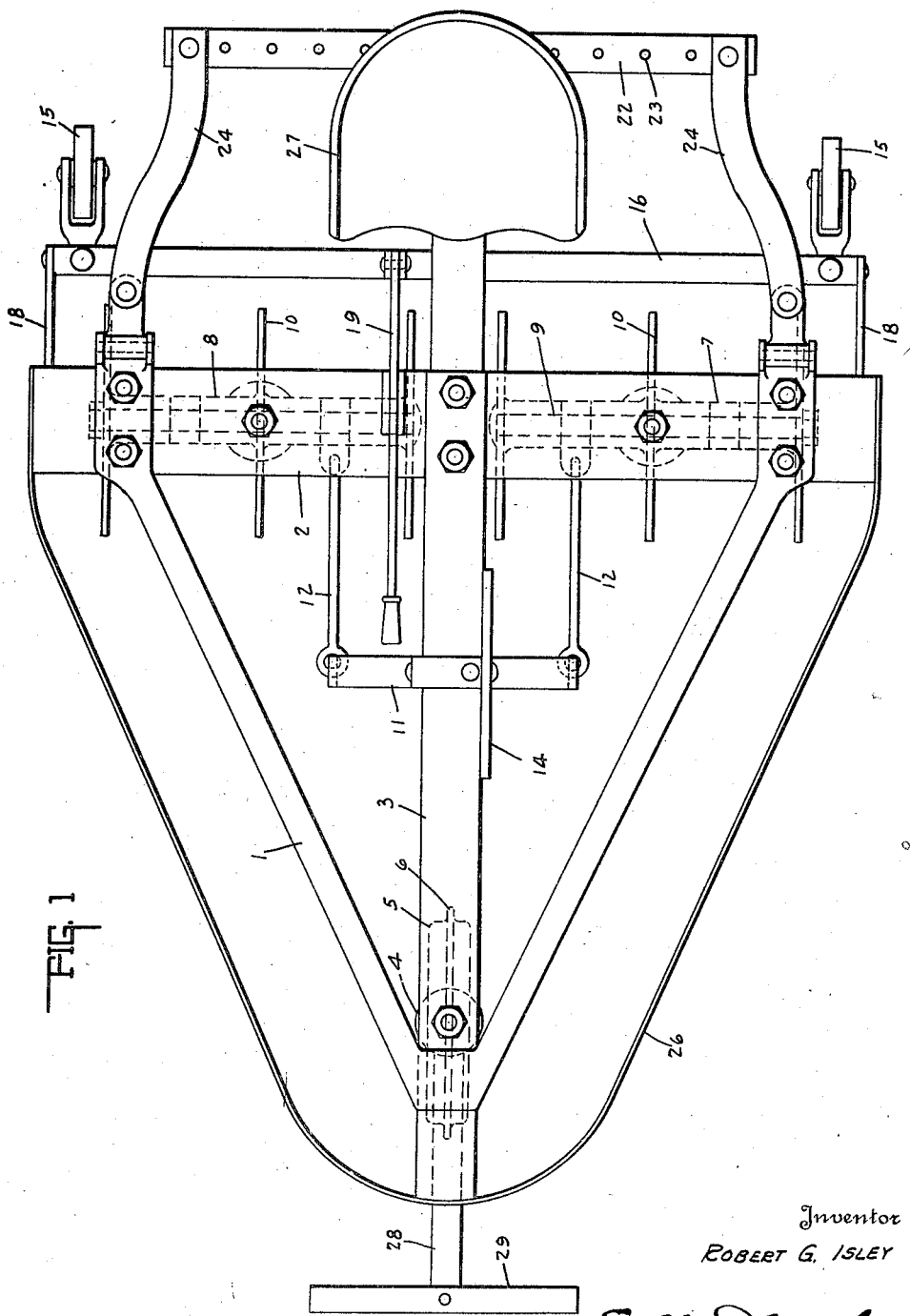

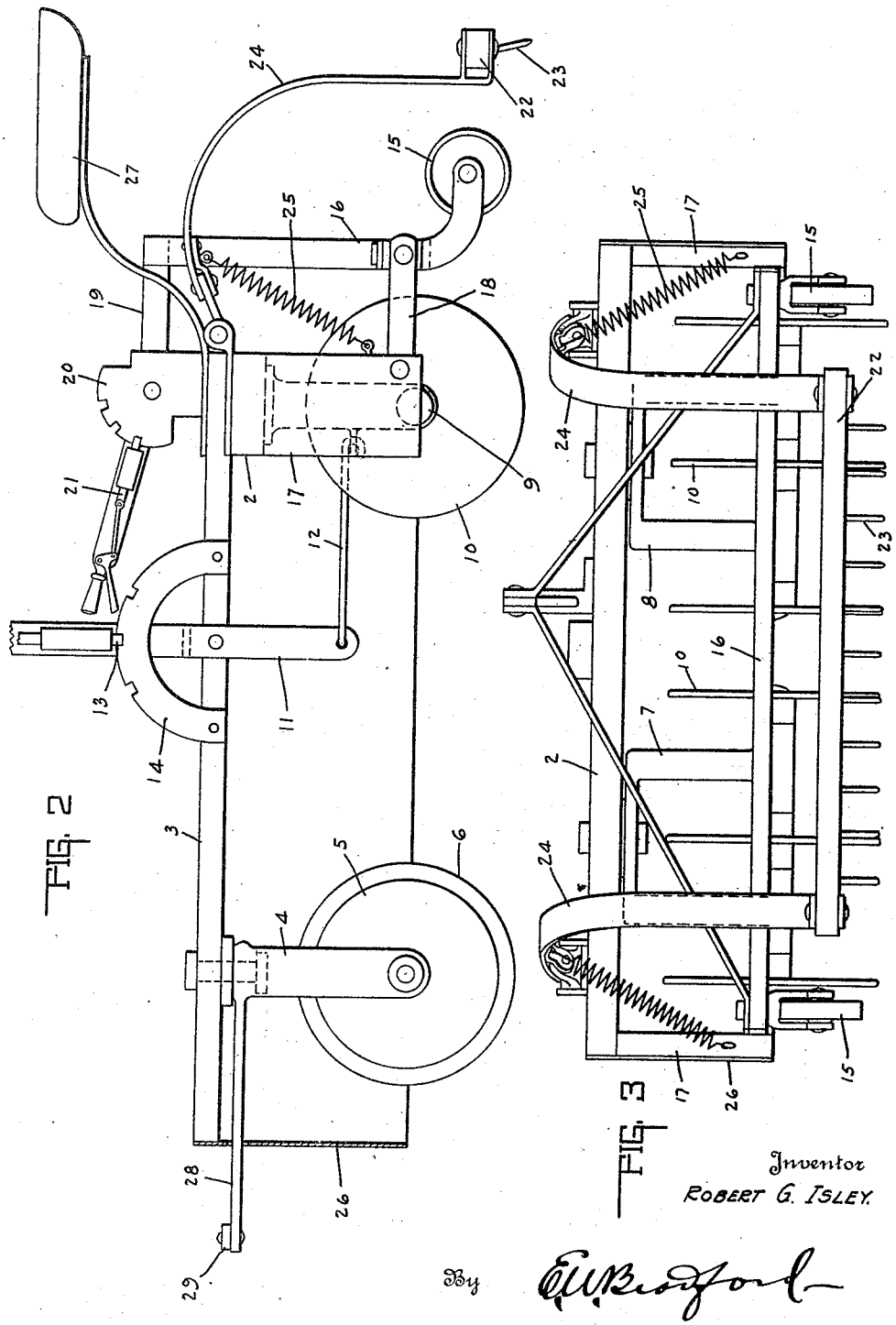

ROBERT G. ISLEY, OF EDINBURG, INDIANA.

CULTIVATOR.

1,422,982.

Specification of Letters Patent.

Patented July 18, 1922.

Application filed April 6, 1921. Serial No. 458,930.

*To all whom it may concern:*

Be it known that I, ROBERT G. ISLEY, a citizen of the United States, residing at Edinburg, in the county of Johnson and State of Indiana, have invented certain new and useful Improvements in Cultivators, of which the following is a specification.

This invention relates to cultivators, and is designed primarily for use in cultivating the soil between the rows of growing corn, especially just prior to the seeding of the ground with wheat.

The prime feature of the invention is the provision of a wheel supported frame carrying cultivating attachments comprising disks and a toothed bar so arranged that they will loosen and pulverize the soil over which the cultivator is passing, and will at the same time serve to clear the soil of weeds and the like.

A further feature of the invention is the provision of means for regulating the position of the cutting disks.

A further feature of the invention is the provision of means for pivotally attaching the tooth carrying bar to the frame of the cultivator and for yieldingly holding the teeth in engagement with the soil.

A further feature of the invention is the provision of means for elevating the cultivating attachments out of engagement with the soil so that the cultivator may be readily moved from point to point.

Other objects and advantages will be hereinafter more fully set forth and pointed out in the accompanying specification.

In the accompanying drawings, which are made a part of this application,

Figure 1 is a top plan view of the cultivator,

Figure 2 is a side elevation of the cultivator with the shield therefor broken away, and Figure 3 is a rear end elevation of the cultivator.

Referring to the drawings, 1 indicates a frame which is substantially V-shaped and is connected at its rear end by a cross bar 2 while a central bar 3 connects the converging end of the frame 1 and the cross bar 2, the central bar 3 projecting forwardly of the frame 1.

Extending downwardly from the central bar 3, adjacent its connection with the frame 1, is a swivel post 4 to which is attached a guide wheel 5, said guide wheel having a flange 6 which enters the soil and holds the cultivator in proper alignment. Pivotally suspended from the cross bar 2 are auxiliary frames 7 and 8 in the lower ends of which are rotatably mounted shafts 9, and on said shafts are mounted cutting disks 10 which are adapted to cut the soil and any obstructions in the nature of weeds or corn stalks which may be lying upon the soil when said disks are in lowered position. The position of the frames 8 and 9 may be shifted so as to cause the disks to throw the soil towards or from the center of the cultivator through the medium of a lever 11 and links 12, one end of the links being connected with the inner ends of the auxiliary frames 8 and 9 while the opposite ends thereof are connected with the lever 11. The lever is pivoted to the central bar 3 and is provided with a latch 13 which co-operates with a rack 14 for holding the auxiliary frames and disks thereon in their adjusted positions.

The depth to which the disks 10 may enter the soil is controlled by a pair of idlers 15 which are swivelly connected with a bar 16, the ends of the bar being pivotally connected with the depending ends 17 of the cross bar 2 by means of straps 18, while the upwardly extending portion of the bar 16 is connected with one end of a lever 19, said lever in turn being pivoted to a rack 20 mounted upon the cross bar 2. The lever 19 is provided with a latch 21 which co-operates with notches in the rack 20 for holding the bar 16, and the idlers 15 carried thereby, in raised or lowered position, and said idlers may be lowered to such a degree as to lift the disks entirely out of engagement with the soil so that the cultivator may be moved from place to place.

In the rear of the disks 10 is a bar 22 to which are attached a plurality of cultivating teeth 23, said bar being pivotally connected with the lower ends of spring arms 24, the upper ends of said arms being pivoted to the ends of the frame 1, and in order to permit the arms 24 and the bar carried thereby to swing laterally, said spring arms are made in two sections and pivoted together at a point adjacent their pivotal connection with the ends of the frame 1, consequently the bar 22 and teeth carried thereby may have a limited amount of lateral swinging movement. The spring arms 24 and the bar 22 carried thereby are normally held in their lowered position by springs 25, one end of the springs being connected with the spring arms 24 adjacent their upper ends while the opposite ends of the springs are connected with the depending portions 17 of the bar 2 adjacent their lower ends.

As the cultivator is used primarily for cultivating the soil between the rows of standing corn, a shield 26 is extended around the frame 1 and is connected at its forward end to the projecting end of the center bar 3 while the rear ends of the shield are connected to the depending portions 17 of the cross bar 2, consequently any stalks that may come in contact with the shield will be moved to one side of the path of the cultivator. The cultivator is also provided with a seat 27, and a guide bar 28 is preferably attached to the swivel post 4 and projects forwardly through the shield 26 and has a singletree 29 connected therewith to which the draft animal is attached.

In operation, after the cultivator has been entered between two rows of standing corn the driver releases the lever 21 which lowers the disks 10 and the bar 22 into engagement with the soil and after the lever 11 has been operated to properly set the disks 10 the draft animal is started forwardly and the cultivating operation begun. The rear end of the frame 1 may be raised at any time to free the cultivating attachment from the soil, and without undue effort, as the levers for raising and lowering the cultivator frame and for positioning the cultivating disks are within easy reach of the driver while occupying the seat 28. As the cultivator travels over the soil, such soil will not only be loosened and properly pulverized, but any weeds that may be growing thereon will be destroyed so that the wheat drill which follows the cultivator, will readily pass over the ground without becoming clogged, and the grain will be properly entered in the soil.

Having thus fully described my said invention, what I claim as new and desire to secure by Letters Patent, is:

1. In a cultivator, a substantially V-shaped frame, a cross bar connecting the rear ends of said frame, said cross bar having depending ends, a central bar connecting the converging end of the frame with said cross bar and projecting forwardly of said frame, a pair of frames pivotally suspended from said cross bar, shafts carried by said pair of frames, cutting disks on said shafts, means for shifting the positions of said disks, a transversely extending bar in the rear of said disks, an idler at each end of said transverse bar, links for connecting the ends of said transverse bar with the depending ends of said cross bar, and a lever for controlling the position of said transverse bar and idlers.

2. In a cultivator, a frame structure, series of cutting disks, a pair of substantially inverted U-shaped auxiliary frames pivotally suspended from parts of the frame structure, shafts carried by the lower ends of said auxiliary frames upon which said disks are mounted, means for shifting the positions of said disks, and means for raising and lowering the rear end of the frame structure for elevating and lowering said disks.

In witness whereof, I have hereunto set my hand and seal at Indianapolis, Indiana, this 31st day of March, A. D. nineteen hundred and twenty-one.

ROBERT G. ISLEY. [L. S.]

Witnesses:
 CAREY S. FRYE,
 M. L. SHULER.